US008542374B2

(12) United States Patent
Nakata

(10) Patent No.: US 8,542,374 B2
(45) Date of Patent: Sep. 24, 2013

(54) PRINTING SYSTEM AND METHOD THEREFOR, PROGRAM FOR IMPLEMENTING THE METHOD, AND STORAGE MEDIUM STORING THE PROGRAM

(75) Inventor: Hiroaki Nakata, Kawasaki (JP)

(73) Assignee: Canon Kabushiki Kaisha (JP)

( * ) Notice: Subject to any disclaimer, the term of this patent is extended or adjusted under 35 U.S.C. 154(b) by 1442 days.

(21) Appl. No.: 11/740,407

(22) Filed: Apr. 26, 2007

(65) Prior Publication Data

US 2007/0253014 A1 Nov. 1, 2007

(30) Foreign Application Priority Data

Apr. 26, 2006 (JP) ................... 2006-122385

(51) Int. Cl.
*G06K 15/00* (2006.01)
*G06F 3/12* (2006.01)

(52) U.S. Cl.
USPC ......................................... 358/1.14; 358/1.15

(58) Field of Classification Search
USPC ....................................................... 358/1.14
See application file for complete search history.

(56) References Cited

U.S. PATENT DOCUMENTS

| 7,321,435 B2* | 1/2008 | Cherry et al. ................ 358/1.14 |
| 7,400,427 B2* | 7/2008 | Honma ......................... 358/1.15 |
| 2004/0125402 A1* | 7/2004 | Kanai et al. ................... 358/1.15 |

FOREIGN PATENT DOCUMENTS

| JP | 2001-100960 A | 4/2001 |
| JP | 2003-150336 A | 5/2003 |

* cited by examiner

*Primary Examiner* — Benny Q Tieu
*Assistant Examiner* — Sunil Chacko
(74) *Attorney, Agent, or Firm* — Rossi, Kimms & McDowell LLP

(57) ABSTRACT

A printing system which realize a finely-tuned print function limitation and hence achieve efficient reduction in cost. The printing system comprises a printing apparatus that executes a print job, a print control apparatus that controls the printing apparatus, a print authority management server that manages an print authority of the printing apparatus, and a data base server that holds a print function limitation information. The print control apparatus transmits two or more pieces of information required to limit a print function of the printing apparatus to request production of a print authority token of limiting the print function. The print authority management server receives the two or more pieces of information, searching the print function limitation information held in the database server based on the respective pieces of information to produce a print authority token, and transmit the print authority token to the print control apparatus. The print control apparatus adds the received print authority token to the print job and then transmit the print job to the printing apparatus. The printing apparatus limits an instruction to the print job based on the print authority token, when the print authority token is added to the received print job.

9 Claims, 14 Drawing Sheets

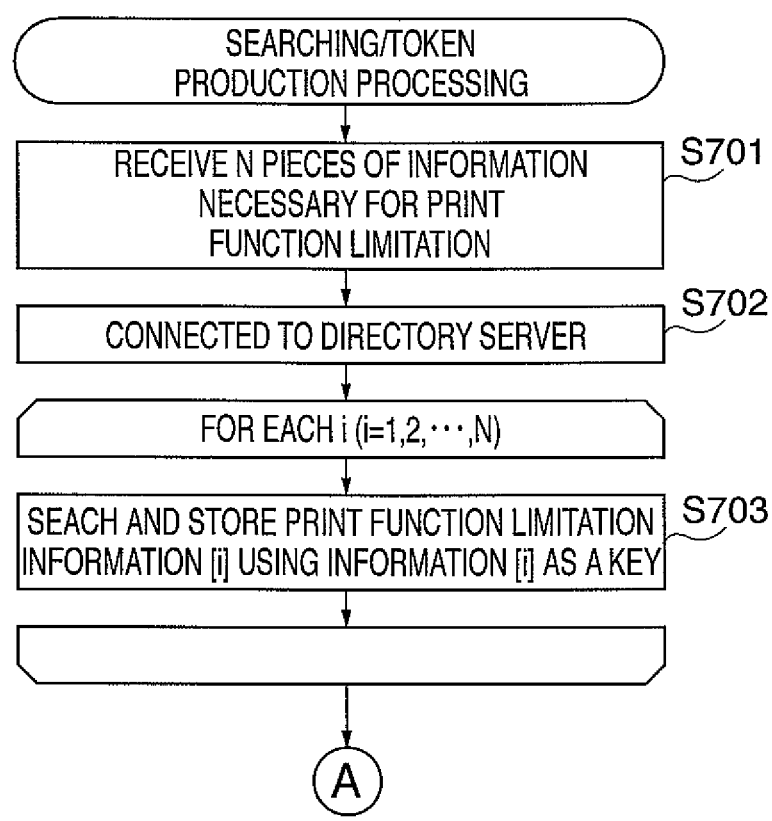

FIG. 8A

PRINT FUNCTION LIMITATION INFORMATION ON USER-BY-USER BASIS

| USER | DUPLEX | NUP | COLOR | SUPPRESS |
|---|---|---|---|---|
| (DEFAULT) | OFF | 1 | RGB | NO |
| USERA | OFF | 2 | BW | NO |
| USERB | ON | 4 | RGB | NO |
| : | : | : | : | : |

FIG. 8B

PRINT FUNCTION LIMITATION INFORMATION ON APPLICATION-BY-APPLICATION BASIS

| APP | DUPLEX | NUP | COLOR | SUPPRESS |
|---|---|---|---|---|
| (DEFAULT) | OFF | 1 | RGB | NO |
| ACROBAT | – | 2 | BW | NO |
| IE | ON | 1 | RGB | YES |
| WORD | OFF | 1 | – | NO |
| : | : | : | : | : |

FIG. 8C

EXAMPLE OF COMPOSITION RESULT
USER=USERA, APP=WORD

| EXAMPLE OF COMPOSITION RESULT | DUPLEX | NUP | COLOR | SUPPRESS |
|---|---|---|---|---|
| COMPOSITION IN THE ORDER OF PRIORITY AMOUNG SEARCH KEYS (APPL. PRIORITY) | OFF | 1 | — | NO |
| COMPOSITION IN THE ORDER OF PRIORITY IN STRENGTH OF PRINT FUNCTION LIMITATION | OFF | 2 | BW | NO |
| COMPOSITION IN THE ORDER OF PRIORITY IN WEAKNESS OF PRINT FUNCTION LIMITATION | OFF | 1 | — | NO |
| ... | ... | ... | ... | ... |

| UNSER ENTRY NAME | PASWORD | MAXIMUM PRINTABLE NUMBER OF SHEETS | NUMBER OF SHEETS ACTUALLY PRINTED | |
|---|---|---|---|---|
| User1 | Akd5sj4f | 500 | 123 | ~21 |
| user2 | saFjf98w | 1000 | 515 | ~22 |
| User3 | vGks9jgla | 2000 | 1021 | ~23 |
| Guset | — | 0 | 0 | ~24 |

PRINTING SYSTEM AND METHOD THEREFOR, PROGRAM FOR IMPLEMENTING THE METHOD, AND STORAGE MEDIUM STORING THE PROGRAM

BACKGROUND OF THE INVENTION

1. Field of the Invention

The present invention relates to a printing system in which a printing apparatus and a print control apparatus are connected via a network, a method therefor, a program implementing the method, and a storage medium storing the program.

2. Description of the Related Art

There has been widely proposed a printing system in which a printer (a printing apparatus) and a host computer (a print control apparatus) are connected via a network, and print job data produced by the host computer is expanded into printer bit map image data to be printed on a sheet of paper.

In this type of printing system, reduction in TCO (Total Cost of Ownership) has recently been spotlighted greatly from the viewpoint of reduction in office expenses or preservation of global environment. The TCO includes not only initial costs such as expenses of introduction of a printer and a printing system but also expenses of consumables such as printing paper and toner typical of colorants.

One of the causes for cost increase is that anyone who accesses a network can perform printing using a printer installed in an office. Since printing limitations are imposed on no one, and no trace of printing is left, a user may fail to exercise self-control. Accordingly, an excessive amount of printing is often performed, thus causing an increase in office costs.

In order to tackle the cost increase problem, a lot of printing systems which perform printing limitation for address information such as an IP address in TCP/IP as the first means and manage the number of printed sheets by acquiring a print log as the second means have been realized.

However, the first means is a rough technique that imposes printing limitations on an apparatus with a particular IP address, and is unable to perform detailed management such as limitation of the number of sheets to be printed by a particular user. The second means is possible to leave a print log for printout, but an administrator needs to monitor the print log to check whether unauthorized printing has been performed. This increases labor costs, which is off the point to reduce the TCO.

In order to solve this problem, there is proposed a user-limiting function which limits printout on a user-by-user basis (see Japanese Laid-Open Patent Publication (Kokai) No. 2003-150336).

FIG. 11 is a schematic view showing the configuration of a conventional printing system.

In FIG. 11, a conventional printing system comprises a host computer 1, an authentication server 2, and printer 3, which are connected with each other via a network 4.

The host computer 1 is used by a user, and produces a print job based on image data. The authentication server 2 holds authentication data and printout limitation data on a user-by-user basis. The printer 3 receives a print job from the host computer 1 via the network 4, and performs printing on an actual printing sheet with a known technology such as electrophotography or ink-jet technology.

FIG. 12 is a table showing a database of authentication data and printout limitation data on a user-by-user basis held in the authentication server in FIG. 11.

In FIG. 12, each row shows a user entry while each column shows the authentication data and the printout limitation data on a user-by-user basis. Reference numeral 11 denotes a user entry name, 12 a password, 13 the maximum printable number of sheets which the user is allowed to be printed by the user for a month, and 14 the number of sheets actually printed by the user in the month.

A password 12 is described in plain text for convenience, but actually, it consists of only one-way hash values in plain text for security in order to prevent passwords from leaking out to third parties. Therefore, authentication is performed by comparing the hash value of an inputted password in plain text with the hash values. Needless to say, only those who have administrative privileges can read and write the database for security.

A row 21 shows an entry of a user whose name is User1. The password is a character string "Akd5sj4f." The maximum printable number of sheets set to 500 shows that the number of sheets available for printing to the User1 for a month is limited to 500. The number of sheets actually printed is a value updated as a result of actual printing upon printing processing being performed by the printer 3, and thereby it is known that the User1 has already printed 123 sheets.

Similarly, a user 2 in a row 22 and a user 3 in a row 23 are defined. A Guest user in a row 24 is described. A password is not registered for the guest user. The maximum printable number of sheets set to 0 shows that the Guest user is not allowed to perform printing. Note that whether to provide a row for a Guest user depends on the design policy of the printing system and that the database may or may not have the row 24 for the Guest user.

A user inputs a user name and password upon logging on to the host computer 1. These pieces of information are transmitted to the authentication server 2, and the authentication server 2 performs user authentication by checking a user name and a password with the user name 11 and the password 12. If the user authentication is successful, the authentication server 2 notifies the host computer 1 of the maximum printable number of sheets and the actually printed number of sheets. For example, if the User1 succeeds in the authentication, the maximum printable number of sheets=500 and the actually printed number of sheets=123 are sent back.

When a print job is actually executed, the host computer 1 takes into consideration the maximum printable number of sheets=500 and the actually printed number of sheets=123, and recognizes that up to 500−123=377 sheets are available for printing and performs printing up to 377 sheets. Alternatively, for example, if the number of sheets by a print job exceeds a printing upper limit of 377, the user is given a warning to follow the predetermined operations mentioned below.

FIG. 13 is a view showing a dialog of GUI (Graphic User Interface) displayed by a printing driver when the host computer 1 executes a print job.

In FIG. 13, a dialog 31 has a print performing button 32 and a print cancel button 33. When the print performing button 32 is pressed, the host computer 1 limits the number of sheets set for the print job to 377 and performs printing. Then, The remaining 23 sheets are not printed out, and hence a user cannot obtain a desired printing result. When the print cancel button 33 is pressed, a print request itself is cancelled. Therefore, a side-effect that the desired printing result is not obtained is not generated.

As mentioned above, even a conventional printing system can limit the printable number of sheets. However it cannot manage minutely e.g. on an printing application-by-application, a printed document-by-document, or a host computer-by computer, needless to say, on both a user-by-user and an application-by-application.

For example, when a user must print out a work report from a work management application, there is a problem that it is not possible to perform printing due to limitation of a printable number of sheets so long as the user executes the application even in a situation where the printable number of sheets allocated to the user reaches zero.

Namely, when a highly necessary particular duty must be performed as in this case, there is a problem that a limitation imposed on a user-by-user basis often becomes an obstacle. Therefore, it is preferable to be able to perform the management of exceptionally lifting the limitation of printable number of sheets, but such a printing system has not been realized.

Conventionally, only the printable number of sheets has been managed, but limitations as to double-sided printing and collective printing which can reduce the number of sheets printed out from a printer itself, and limitations as to color/monochrome printing have not been managed.

SUMMARY OF THE INVENTION

The present invention provides a printing system and a method therefore, a program implementing the method, and a storage medium storing the program, which realize a finely-tuned print function limitation and hence achieve efficient reduction in cost.

In a first aspect of the present invention, there is proposed a printing system comprising a printing apparatus adapted to execute a print job, a print control apparatus adapted to control the printing apparatus, a print authority management server adapted to manage an print authority of the printing apparatus, and a data base server adapted to hold a print function limitation information, the printing apparatus, the print authority management server, and the data base server being connected with one another via a network, wherein the print control apparatus comprises an information requesting unit adapted to transmit two or more pieces of information required to limit a print function of the printing apparatus, to request production of a print authority token of limiting the print function, the print authority management server comprises a token producing unit adapted to receive the two or more pieces of information, search the print function limitation information held in the database server based on the respective pieces of information to produce the print authority token, and transmit the print authority token to the print control apparatus, the print control apparatus comprises a token adding unit adapted to add the received print authority token to the print job and then transmit the print job to the printing apparatus, and the printing apparatus comprises a limiting unit adapted to limit an instruction to the print job based on the print authority token, when the print authority token is added to the received print job.

Each of the transmitted two or more pieces of information can comprise a user information related to a user of the printing apparatus.

Each of the transmitted two or more pieces of information can comprise an application information related to an application for executing the print job.

Each of the transmitted two or more pieces of information can comprise a contents information of a document related to the print job.

Each of the transmitted two or more pieces of information can comprise an address information of the print control apparatus.

The print function limited by the print authority token can include the number of sets printed, color/monochrome printing, double-sided printing, and collective printing.

The print function limited by the print authority token can include the printable number of sets.

The token producing unit can compose two or more pieces of the print function limitation information with each other in the order of priority among search keys.

The token producing unit can compose two or more pieces of the print function limitation information with each other in the order of priority in strength of print function limitation.

The token producing unit can compose two or more pieces of the print function limitation information with each other in the order of priority in weakness of print function limitation.

The print control apparatus can comprise a printing stop unit adapted to stop transmission of the print job to the printing apparatus when the received print authority token includes an instruction to stop printing.

The print control apparatus can comprise a printing stop unit adapted to stop printing of the print job when the received print authority token includes an instruction to stop printing.

In a second aspect of the present invention, there is proposed a printing method of a printing system comprising a printing apparatus adapted to execute a print job, a print control apparatus adapted to control the printing apparatus, a print authority management server adapted to manage an print authority of the printing apparatus, and a data base server adapted to hold a print function limitation information, the printing apparatus, the print authority management server, and the data base server being connected with one another via a network, wherein the print control apparatus transmits two or more pieces of information required to limit a print function of the printing apparatus, to request production of a print authority token of limiting the print function, the print authority management server receives the two or more pieces of information, searches the print function limitation information held in the database server based on the respective pieces of information to produce the print authority token, and transmits the print authority token to the print control apparatus, the print control apparatus adds the received print authority token to the print job and then transmit the print job to the printing apparatus, and the printing apparatus limits an instruction to the print job based on the print authority token, when the print authority token is added to the received print job.

In a third aspect of the present invention, there is proposed a program that causes a computer to execute the above-mentioned printing method of the printing system.

In a fourth aspect of the present invention, there is proposed a computer-readable storage medium that stores the above-mentioned program.

According to the present invention, the print control apparatus transmits two or more pieces of information required to limit a print function of the printing apparatus to request production of a print authority token of limiting the print function, the print authority management server receives the two or more pieces of information, searching the print function limitation information held in the database server based on the respective pieces of information to produce a print authority token, and transmit the print authority token to the print control apparatus, the print control apparatus adds the received print authority token to the print job and then transmit the print job to the printing apparatus, and the printing apparatus limits an instruction to the print job based on the print authority token, when the print authority token is added to the received print job. Therefore, it is possible to realize a finely-tuned print function limitation and hence achieve efficient reduction in cost.

The above and other objects, features, and advantages of the invention will become more apparent from the following detailed description taken in conjunction with the accompanying drawings.

BRIEF DESCRIPTION OF THE DRAWINGS

FIGS. 7A and 7B are flowcharts showing the procedures of search/token creation process executed in the step S503;

FIG. 8A is a table showing the print function limitation information database on a user-by-user basis held in the directing server in FIG. 1, FIG. 8B is a table showing the print function limitation information on an application-by-application base contained in the print function limitation database, and FIG. 8C is a table showing the print function limitation information obtained by composing respective tables of FIG. 8A and FIG. 8B;

DETAILED DESCRIPTION OF THE PREFERRED EMBODIMENTS

Present invention will now be described in detail below with reference to the accompanying drawings showing preferred embodiment thereof.

Figure 1:
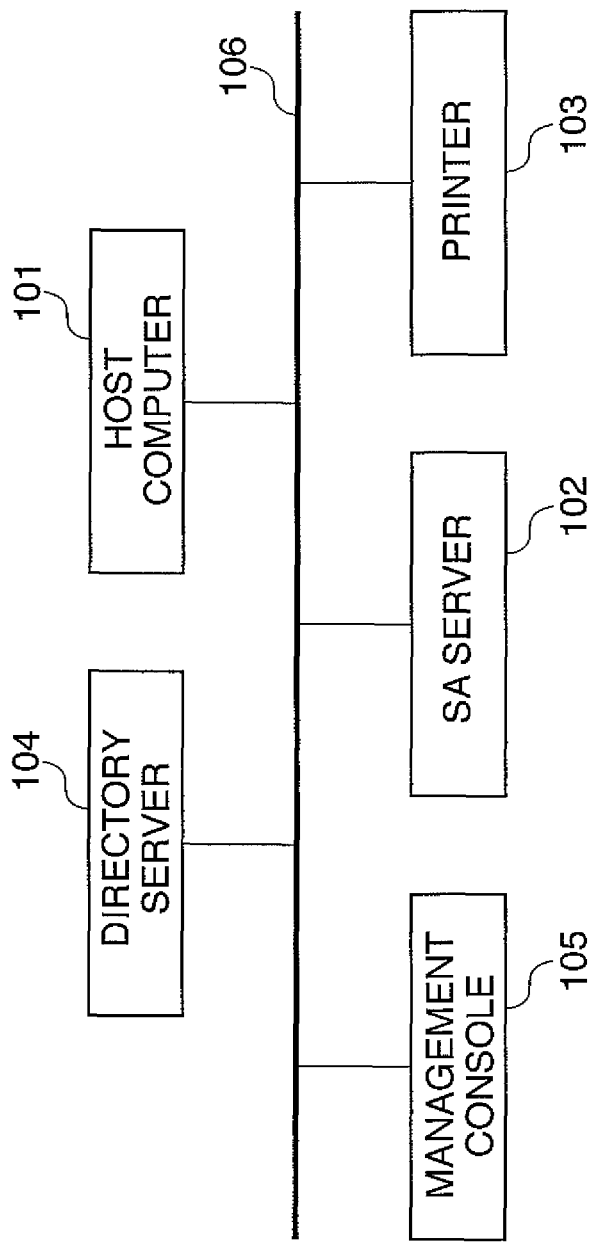
FIG. 1 is a view schematically showing the configuration of a printing system according to an embodiment of the present invention.

FIG. 1 is a view schematically showing the configuration of a printing system according to an embodiment of the present invention.

As shown in FIG. 1, a printing system according to an embodiment of the present invention comprises a host computer 101, SA (Security Agent) sever 102, a printer 103, a directory server 104, and a management console 105, which are connected with one another via a network 106.

The host computer 101 used by a user produces a print job based on image data. The SA server 102 transmits a print authority token to the host computer 101. The printer 103 receives a print job from the host computer 101 via the network 106 and performs printing on an actual printing sheet using a known printing technology such as electrophotography or ink-jet technology.

The directory server 104 holds a data base for printing function limitation data in FIG. 8 mentioned below from which a print authority token is produced. A management console 105 is a computer which manages a data base in the directory server 104.

Figure 2:
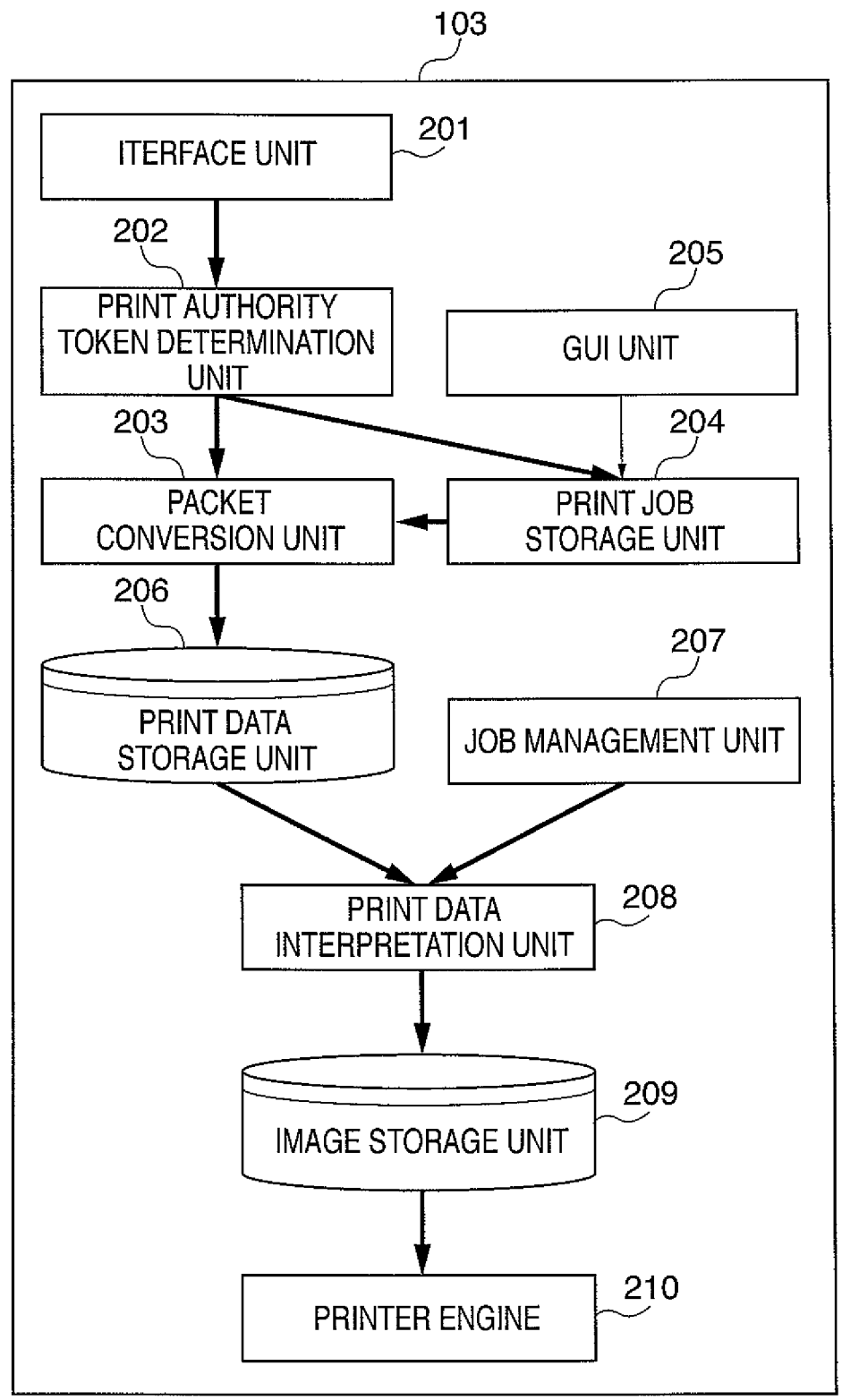
FIG. 2 is a block diagram showing the configuration of the printer 103 in FIG. 1.

FIG. 2 is a block diagram schematically showing the configuration of the printer 103 in FIG. 1.

As shown in FIG. 2, the printer 103 comprises an interface unit 201, a print authority token determination unit 202, a packet conversion unit 203, a print job cancellation unit 204, a GUI unit 205, and a print data storage unit 206. Furthermore, the printer 103 comprises a job management unit 207, a print data interpretation unit 208, an image storage unit 209, and a print engine 210.

The interface unit 201 is connected to the network 106, and receives a print job from the host computer 101. The print authority token determination unit 202 determines whether or not a print authority token is given to a print job by determining a format of a received print job. When a print authority token is given to a print job, the packet conversion unit 203 limits an instruction to a print job based on the print function limitation information, and then gives the limited instruction to the following stage.

The print job cancellation unit 204 gives an instruction of cancellation of printing to a print job to which a print authority token is not given and a print job containing a print cancellation attribute in print data included in a print job, namely, PDL data. The GUI unit 205 activates the operation of the print job cancellation unit 204 via an operation panel not shown.

A print data storage unit 206 stores print data, namely PDL data temporarily. A job management unit 207 stores printout attribute data such as the number of sheets and monochrome/color of a print job temporarily. A print data interpretation unit 208 obtains the print data from the print data storage unit 206, performs image generation process, and produces data based on the printout attributes stored in the job management unit 207.

An image storage unit 209 temporarily stores the image data produced by the print data interpretation unit 208 until printing finishes. The print engine 210 actually prints the image data stored in the image storage unit 209 on media such as a printing sheet with a known technology such as electrophotography or ink-jet technology.

Meanwhile, although each of the print data storage unit 206 and the image storage unit may be composed of a secondary storage device such as a high-capacity hard disk, the present invention is not limited to any particular physical configuration.

Figure 3:
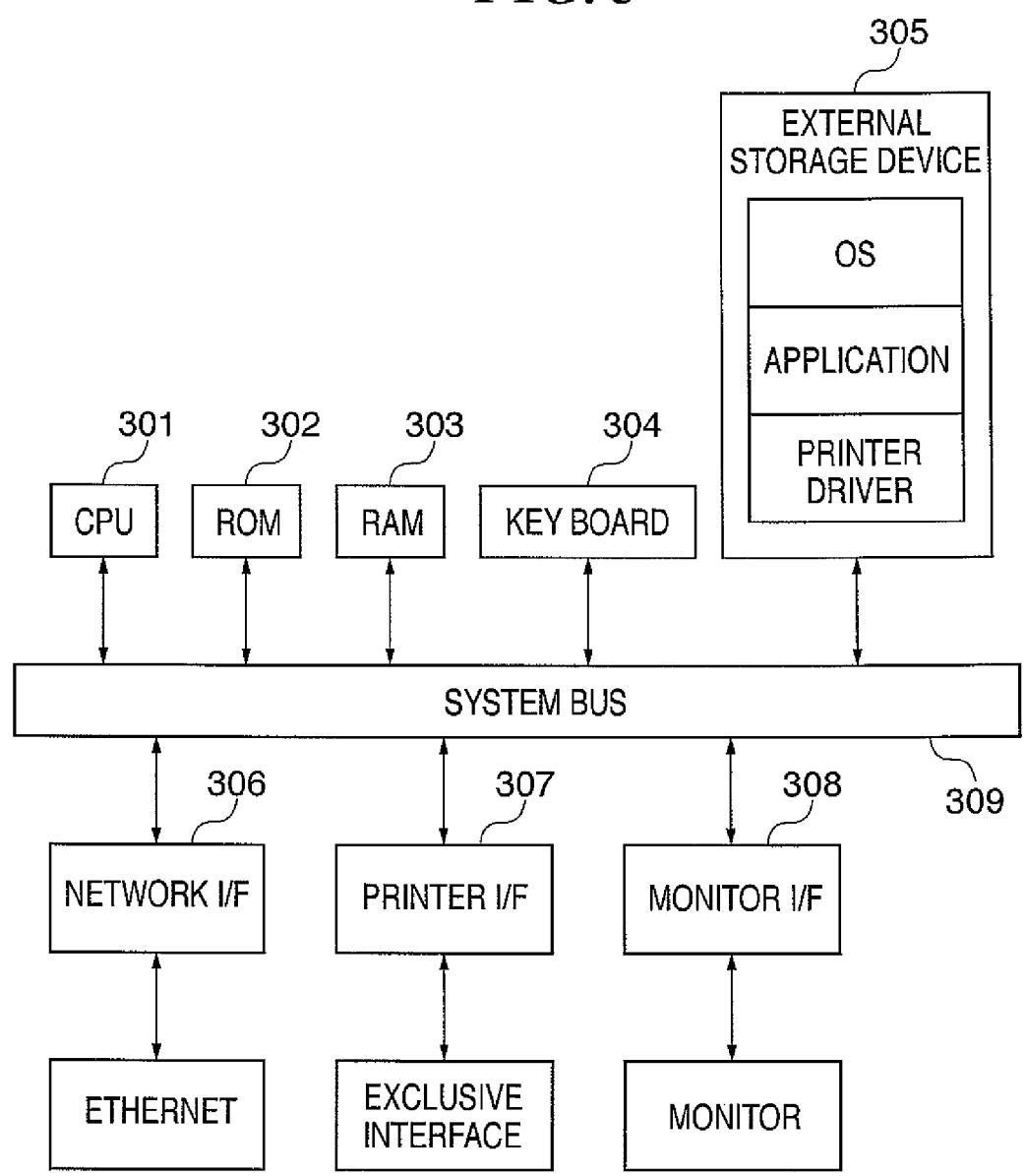
FIG. 3 is a view schematically showing the configuration of a host computer 101 in FIG. 1.

FIG. 3 is a view schematically showing the configuration of a host computer 101 in FIG. 1.

As shown in FIG. 3, the host computer 101 comprises a CPU 301, a ROM 32, a RAM 303, a keyboard 304, an external storage device 305, a network I/F 306, a printer I/F 307, and a monitor I/F, which are connected with one another via a system bus 309.

The CPU 301 controls the whole apparatus according to the program stored in the ROM 302, the RAM 303, or the external storage device 305. The RAM 303 is used as a work area when the CPU performs various kinds of processes. The external storage device 305 records software such as an operating system (OS), an application, and a printer driver.

The input devices such as the keyboard 304 or a mouse (not shown) are devices to which a user gives various kinds of instructions. The network I/F 306 and the printer I/F 307 are interfaces which give and receive data. The network I/F 306 is connected to the printer 103 via Ethernet®, and the printer I/F 307 is connected to the printer 103 via an exclusive interface. The monitor I/F 308 is connected to a monitor, and transfers display data.

Figure 4:
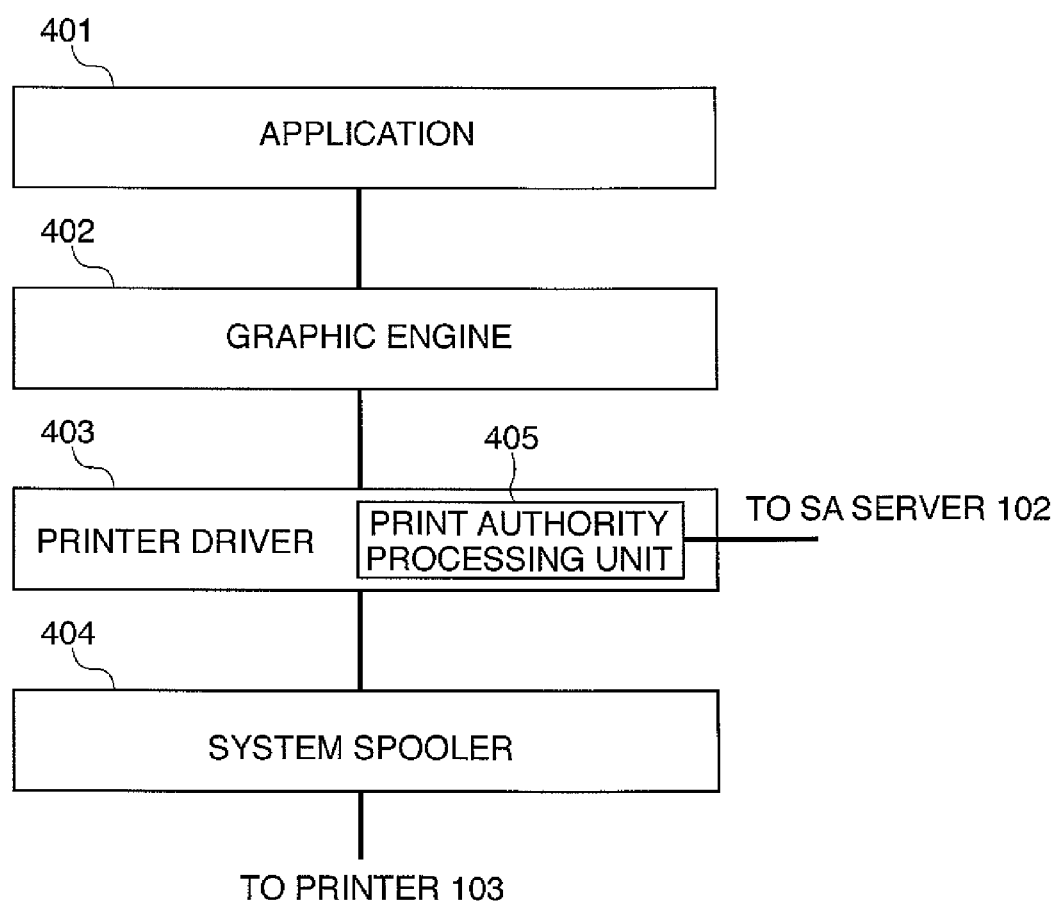
FIG. 4 is a view schematically showing a print processes module in the host computer of FIG. 3.

FIG. 4 is a view schematically showing a print processing module in the host computer of FIG. 3.

As shown in FIG. 4, the host computer 101 comprises an application 401, a graphic engine 402, a printer driver 403, and a system spooler 404.

The application 401, the graphic engine 402, the printer driver 403, and the system spooler 404 are stored in the external storage device 305 as a file. They are a program module which is loaded into the RAM 303 by a module using the OS and its module, and is executed.

The application 401 and the printer driver 403 can be written into the external storage device 305 such as a hard disk via an FD (not shown), a CD-ROM, or a network (not shown).

The application held in the external storage device 305 is loaded in the RAM 303 and executed thereon. The application 401 causes the printer 103 to perform printout (drawing) using the graphic engine 402 loaded in the RAM 303 likewise.

The graphic engine 402 loads the printer driver 403 prepared for each printer from the external storage device 305 into the RAM 303, and sets the output of the application 401 at the printer driver 403. The graphic engine 402 converts a GDI (Graphics Device Interface) function obtained from the application 401 into a DDI (Device Driver Interface) function, and outputs it to the printer driver 403.

The printer driver 403 converts the DDI function received from the graphic engine 402 into PDL data which is a control command recognizable to the printer 103. The converted PDL data is outputted to the printer 103 as a print job through the printer I/F 307 via the system spooler 404 loaded into the RAM 303 by the OS.

The printer driver 403 has a print authority processing unit 405 therein. The print authority processing unit 405 may be a built-in module of the printer driver 403, or a library module added separately by installation.

When the printer driver 403 performs printing, the print authority processing unit 405 is loaded by the printer driver 403. When the print authority processing unit 405 is loaded, it collects two or more pieces of information necessary for print function limitation on the host computer 101, transmits these two or more pieces of information to the SA server 102, and receives a print authority token as a reply from the SA server 102.

The print authority processing unit 405 adds a received print authority token to a print job including print data, namely PDL data, and outputs this print job to the printer 103 via the system spooler 404 in the same way as before, furthermore the printer I/F 307.

Figure 5:
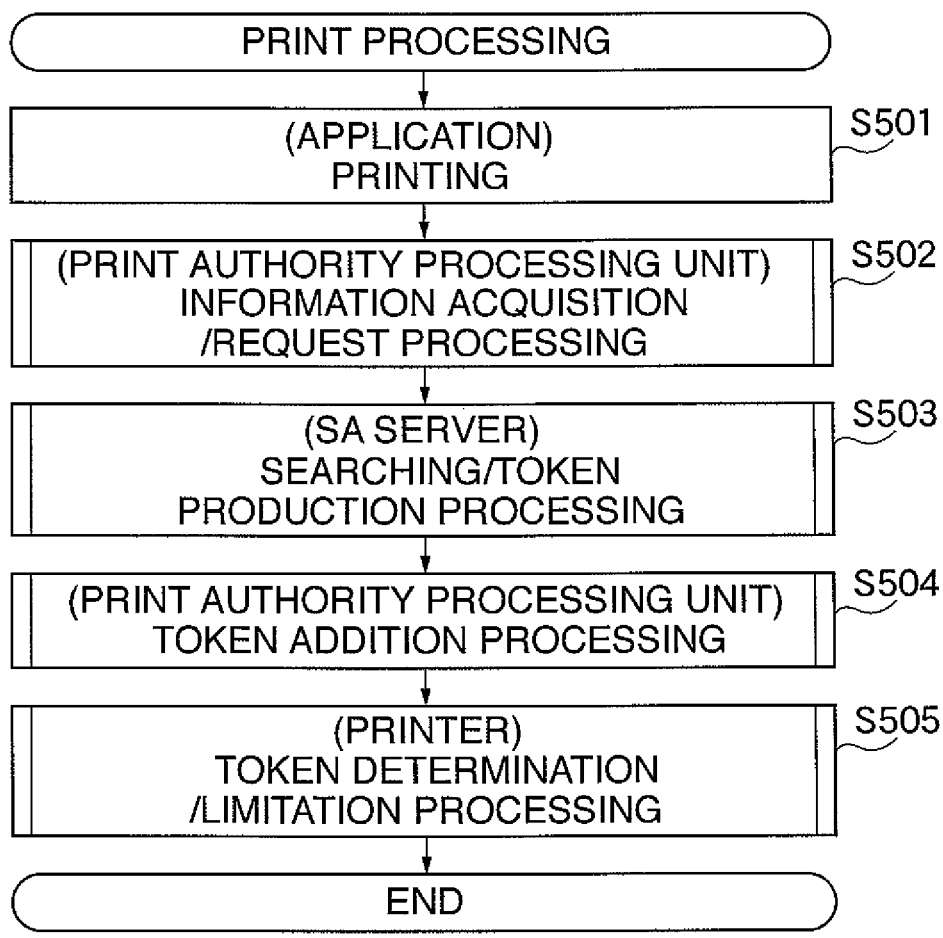
FIG. 5 is a flowchart showing the process of print processing performed by the host computer of FIG. 3.

FIG. 5 is a flowchart showing the process of print processing performed by the host computer of FIG. 3.

As shown in FIG. 5, a user using the host computer 101 performs printing through the print dialog (step S501). When the print authority processing unit 405 is further loaded by the printer driver 403 loaded for printing, it performs an information acquisition/request processing in FIG. 6 described later, collects two or more pieces of information necessary for the print function limitation, and requests production of the print authority token to the SA server 102 by transmitting them to the SA server 102 (step S502).

Next, the SA server 102 performs a searching/token production processing of FIG. 7, described later, obtains a plurality of print function limitation information responding to respective keys by searching from the print function limitation information database held in the directory server 104 as keys of two or more pieces of information received from the print authority processing 405, further composes a plurality of the obtained print function limitation information, produces a print authority token, and transmits it to the print authority processing unit 405 (step S503).

Next, when the print authority processing unit 405 performs a token addition processing in FIG. 9 described later and receives the produced print authority token, it adds the print authority token to the print job produced by the printer driver 403 and transmits the print job to the printer driver 403 and further to the printer 103 via the system spooler 404 (step S504).

Next, the printer 103 performs a token determination/limitation processing in FIG. 10 described later, and determines whether or not the print authority token is added to the received print job. When it is added, the instruction to the print job is limited according to the description of the print authority token and the printout is performed in the limited style, followed by terminating the procedure.

According to the processing in FIG. 5, the printer 103 limits the instruction to the print job according to the description of the print authority token and the printout is performed in the limited style (step S505). Therefore, it is possible to realize a finely-tuned print function limitation management, and achieves efficient reduction in cost.

Figure 6:
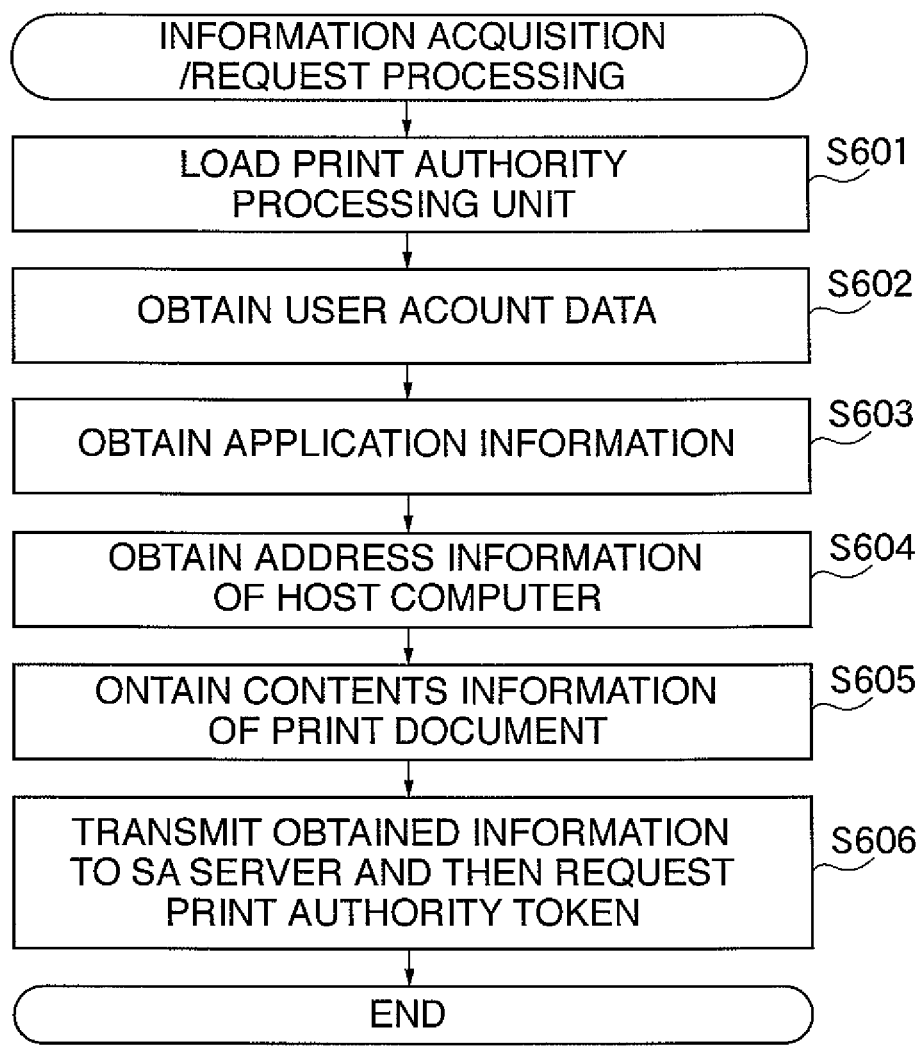
FIG. 6 is a flowchart showing the procedures of the information procurement/request performed in the step S502 in FIG. 5.

FIG. 6 is a flowchart showing the procedures of the information procurement/request performed in the step S502 in FIG. 5.

As shown in FIG. 6, the print authority processing unit 405 is further loaded by the printer driver 403 loaded for printing processing (step S601). Next, the print authority processing unit 405 obtains user account data (step S602).

In this context, the user account data means a user's identification data which is used so that a user having an intention to perform printing may log into the host computer 101. A domain account used in a unit of a network is cited as an example. The user account is obtainable via API (Application Program Interface) and the like provided by an OS.

Next, the print authority processing unit 405 obtains the application information (step S603). In this context, the application information means the information such as the name of an application which can identify the application 401 used by a user for printing.

For example, the name of an application can be obtained by obtaining the process information of the printer driver 403 which has loaded the print processing unit 405 and the application 401 which has further loaded the printer driver 403, and taking out the name of the process image from the obtained process information.

Next, the print processing unit 405 obtains the address information of the host computer 101 (step S604). The address information of the host computer 101 means information such as an IP address and a name of DNS which can identify in the network the host computer 101 with which printing is literally performed Next, the print authority processing unit 405 obtains the contents information of print documents (step S605). For example, the contents information of print documents is the information used for the purpose of customizing the management method of printing function limitation according to the kind and character of documents to be further printed in spite of the documents to be printed from the same application.

Information such as a print document name transmitted by the API of the OS is an example. Alternatively, contents identification information transmitted through a unique interface provided by a frame of an SDK (Software Development Kit) placed between the application 401 and the printer driver 403 is another example.

Next, the print authority processing unit 405 transmits n (n is two or more) pieces of information out of the information obtained in the steps S601 to S605 to the SA server 102, and then requests the SA server 102 to produce the print token and transmit the same, followed by terminating the process.

Transmission between the print authority processing unit 405 and the SA server is performed with known techniques such as TCP, UDP and SOA. Specifically, data of information or instruction to be transmitted is written in a format (a binary which serializes structure data, XML and the like). It is divided into data units called packets suitable for transmitting with the API of the OS or the like, and they are transmitted with one another via the network 106.

As shown hereunder, transmission via the network 106 by the respective nodes (shown from 401 to 404 in FIG. 4), namely, a sender and a receiver in transmission is performed in the same way as the step S606.

Figure 7B:
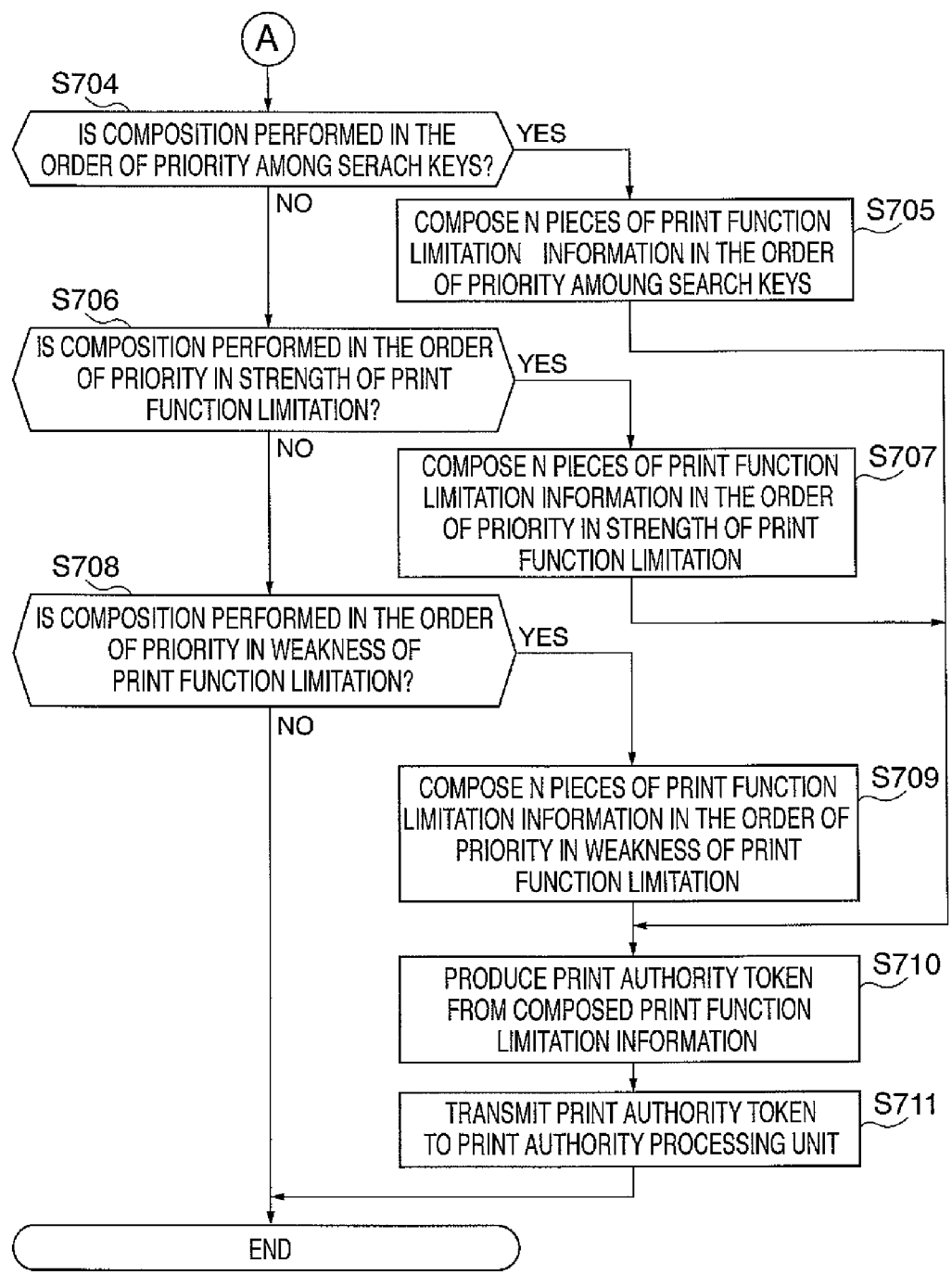

FIGS. 7A and 7B are flowcharts showing the procedures of the search/token creation processing executed in the step S503.

A subject on the SA server 102 in this embodiment is a process called SA service which acts on the SA server. In this context, however, the SA server is not distinguished from the SA service, and the SA server is uniformly used for the sake of convenience hereafter.

As shown in FIG. 7A, the SA server 102 receives N (N is two or more) pieces of information necessary for print function limitation via the network 106 (step S701). Specifically, it receives two pieces of user account information and application information according to the present embodiment.

Next, the SA server 102 is connected to the directory server 104 (step S702). Specifically, the SA server 102 is connected to the directory server 104, and initialization, which is needed when the print function limitation database in FIGS. 8A to 8C described later held in directory server 104 is searched, is performed.

For example, when an active directory method is used as the directory server 104, an interface called ADSI (Active Directory Service Interface) is used to access the database. Initialization of the ADSI is performed in the step S702).

Next, using information [i], namely i-th information, as a key, the SA server 102 searches a print function limitation information [i] corresponding to the key from the directory server 104, and holds it in a storage area in the SA server 102 (step S703). In the step S703, i is stepwise added like 1, 2, . . . , N, and it is repeated N times. Therefore, N pieces of print function limitation information are searched and stored as a result.

FIGS. 8A to 8C are tables of print function limitation data base held on the directory server 104 in FIG. 1.

FIG. 8A shows the print function limitation information on a user-by-user basis, FIG. 8B shows the print function limitation information on an application-by-application base, and FIG. 8C shows the print function limitation information obtained by composing respective pieces of information of FIG. 8A and FIG. 8B. As is shown in FIGS. 8A to 8C, specifically, the print function information is a set of information combined by the following four pieces of information; Duplex (double-sided printing), Nup (collective printing), Color (color/monochrome printing), and Suppress (printing banned). The print function limitation information may include the number of sets printed and the printable number of sets.

What respective possible values mean will be described below. In Duplex, "Off" means that the double-sided printing may or may not be performed while "On" means that the double-sided printing must be surely performed. "On" is a stronger function limitation. In Nup, "1" means that pages 1, 2, 4, 6, 9, and 16 can be collected, "2" means that pages 2, 4, 6, 9, and 16 can be collected, "4" means that pages 4, 6, 9, 16 can be collected, "6" means that pages 6, 9, and 16 can be collected, "9" means that pages 9 and 16 can be collected, and "16" means that only page 16 can be collected. The later described one is the stronger limitation. In Color, "RGB" means that color printing or monochrome printing may be performed, and "BW" means that monochrome printing must be surely performed. "BW" is the stronger limitation. In Suppress, "No" means that printing is permitted, and "Yes" means that printing is banned. "Yes" is the stronger limitation. However, there may be employed a value that makes a designation to no information (described in a mark "-").

The print function limitation information can be compiled by the management program provided with a user interface on the management console 105. Specifically, compilation is change processes such as addition or deletion of keys and print function limitation information to the respective tables, and change of the existing print function limitation information values.

The change processes are realized using the interface of ADSI when the directory server 104 adopts an active directory method. In the step S703, when the search with a key of information [i] is performed, the directory server 104 determines the kind of the key of information [i], and which table the search is performed at first. Next, the determined table is searched first with a key, and matched one is returned as a search result.

For example, when the key of information [1] is UserA (the kind of the key is user account information), the print function limitation information [1], namely "Duplex=Off, Nup=2, Color=Not Designated, Suppress=No", is returned as a search result. When the key of information [2] is a Word (the kind of the key is the application information), the print function limitation information [2], namely "Duplex=Off, Nup=1, Color=BW, Suppress=No", is returned as a search result.

Meanwhile, each table also holds print function limitation information of default in order to return a search result when the search is performed with a key which does not exist in the table (the line shown by default). In determining steps S704, S706, and S708, the SA server 102 determines "the composition mode" how N pieces of print function limitation information searched and stored in the step S703 are composed into one.

Namely, the composition mode is selected among the following three modes; composition is performed in the order of priority among search keys, composition is performed in the order of priority in strength of print function limitation, or composition is performed in the order of priority in weakness of print function limitation. When the step S704 is affirmative, the SA server 102 composes the N pieces of print function limitation information in the order of priority among search keys (step S705).

This is a mode which performs composition putting a priority on the print function limitation information searched with two keys used for searching, whichever is greater in priority. Meanwhile, it is supposed that the priority of keys is predetermined on the SA server 102. The result of composition in the step S705 is shown in the "composition in order of priority among search keys (App priority)."

This result is reached by a composition rule that basically a value of print function limitation information with high priority is adopted, and that if there is a value which is not designated by the print function limitation information with high priority, a low value is adopted.

When the result of the determination in the step S706 is affirmative, the SA server 102 composes the N pieces of print function limitation information in the order of priority in strength of print function limitation (step S707). This composition is performed by comparing respective values of the two pieces of print function limitation information, and adopting the stronger setting. The result of the composition in the step S707 is shown in "composition in the order of priority in strength of print function limitation" in the result of the composition in FIG. 8C.

When the result of the determination in the step S708 is affirmative, the SA server 102 composes the N pieces of print function limitation information in the order of priority in weakness of print function limitation (step S707). This composition is performed by comparing respective values of the two pieces of print function limitation information, and adopting the weaker setting contrary to the step S707. The result of the composition in the step S709 is shown in "composition in the order of priority in weakness of print function limitation." in the result of the composition in FIG. 8C.

Meanwhile, the examples described in the steps S705, S707 and S709 are the cases where N is equal to 2. When N is three or more, arbitrary two pieces of print function limitation information are taken out and composed into one, and finally composed into one by repeating its action. The result of the composition never changes whatever way of taking out is adopted due to the characters of the composition method.

Next, the SA server 102 produces the print authority token from the composed print function limitation information (step S710). According to the present embodiment, the print authority token is data transmitted finally to the printer 103 together with PLD data, and plays mainly two roles.

The first role is a kind of permit card, and it is arranged that it is not possible to perform printing if the print authority token is not attached. The second role is transmission of the print function limitation information to the printer 103, which limits the setting of the print job so that the print-out is performed in a limited style according to the print function limitation information transmitted by the print authority token.

In the step S710, the print function limitation information is converted into a predetermined format possible to be interpreted by the printer 103 (binary data such as a job language). It is formatted together with the other information to be possessed by the print authority token, and the print authority token data is created. Finally, the SA server 102 transmits the created print authority token to the print authority processing unit 505 (step S711), followed by terminating the process.

Figure 9:
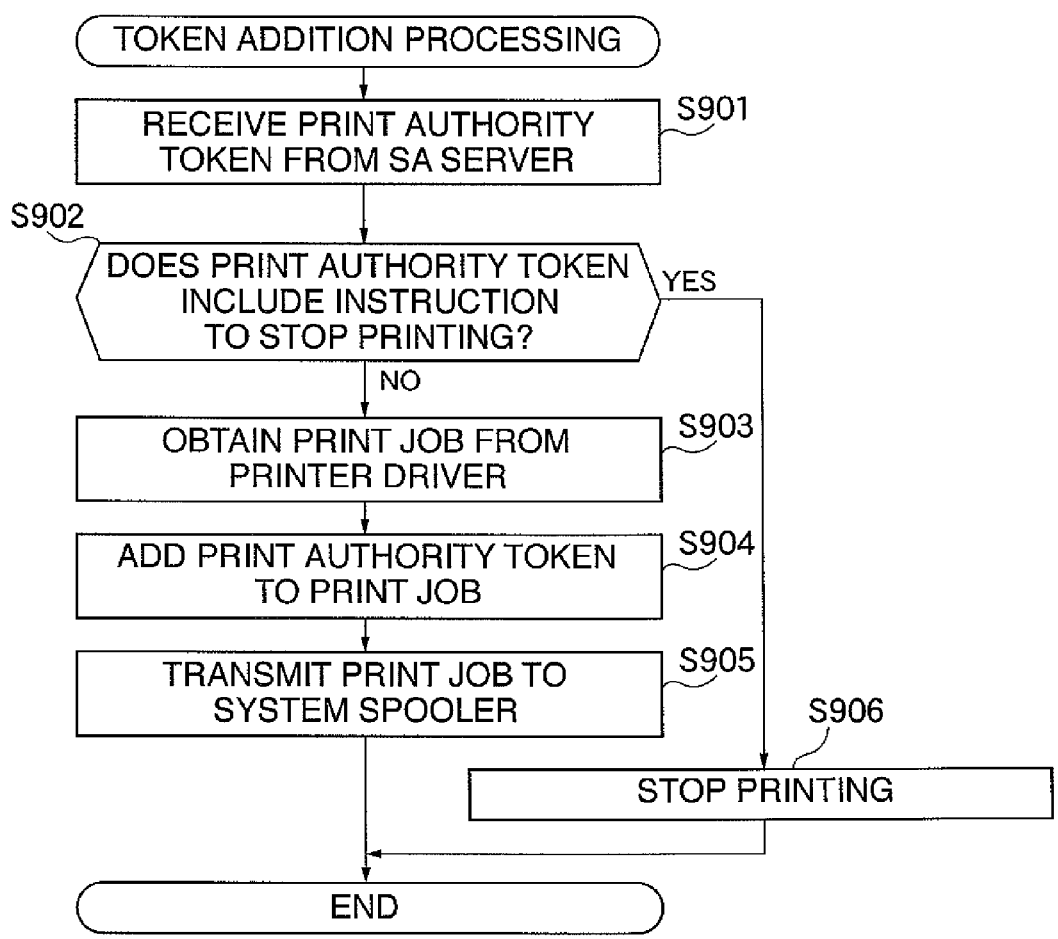
FIG. 9 is a flowchart showing the procedures of token addition process executed in the step S504 in FIG. 5.

FIG. 9 is a flowchart showing the procedures of the token addition process executed in the step S504 in FIG. 5.

In FIG. 9, the print authority processing unit 405 receives the print authority token from the SA server 102 (step S901). Next, the print authority processing unit 405 determines whether or not the print authority token includes an instruction to stop printing. When an instruction to stop printing (Suppress=Yes) is given, the process proceeds to the step S906. Otherwise, the process proceeds to the step S903 (step S902).

In the step S906, the print authority processing unit 405 stops printing. Specifically, there are two modes; 1) the print job is stopped in the printer driver 403 which is a load source of the print authority processing unit 405, and 2) let the process go on and the printer 103 stop the print job. In the case of 2), the process proceeds to the step 903 by transition (not shown).

As a result of the determination in the step S902, when there is not an instruction to stop printing, the print authority processing unit 45 obtains the print job, namely the PDL data from the printer driver 403 (step S903). Next, the print authority processing unit 405 adds the print authority token to the print job, namely the PDL data, that is, the two PDL data are linked (step S904).

Finally, the print authority processing unit 405 transmits the print job with the print authority token to the system spooler 404 via the printer driver 403 (step S905). The print job transmitted to the system spooler 404 is transmitted to the printer 103 via the network 106, followed by terminating the process.

Figure 10:
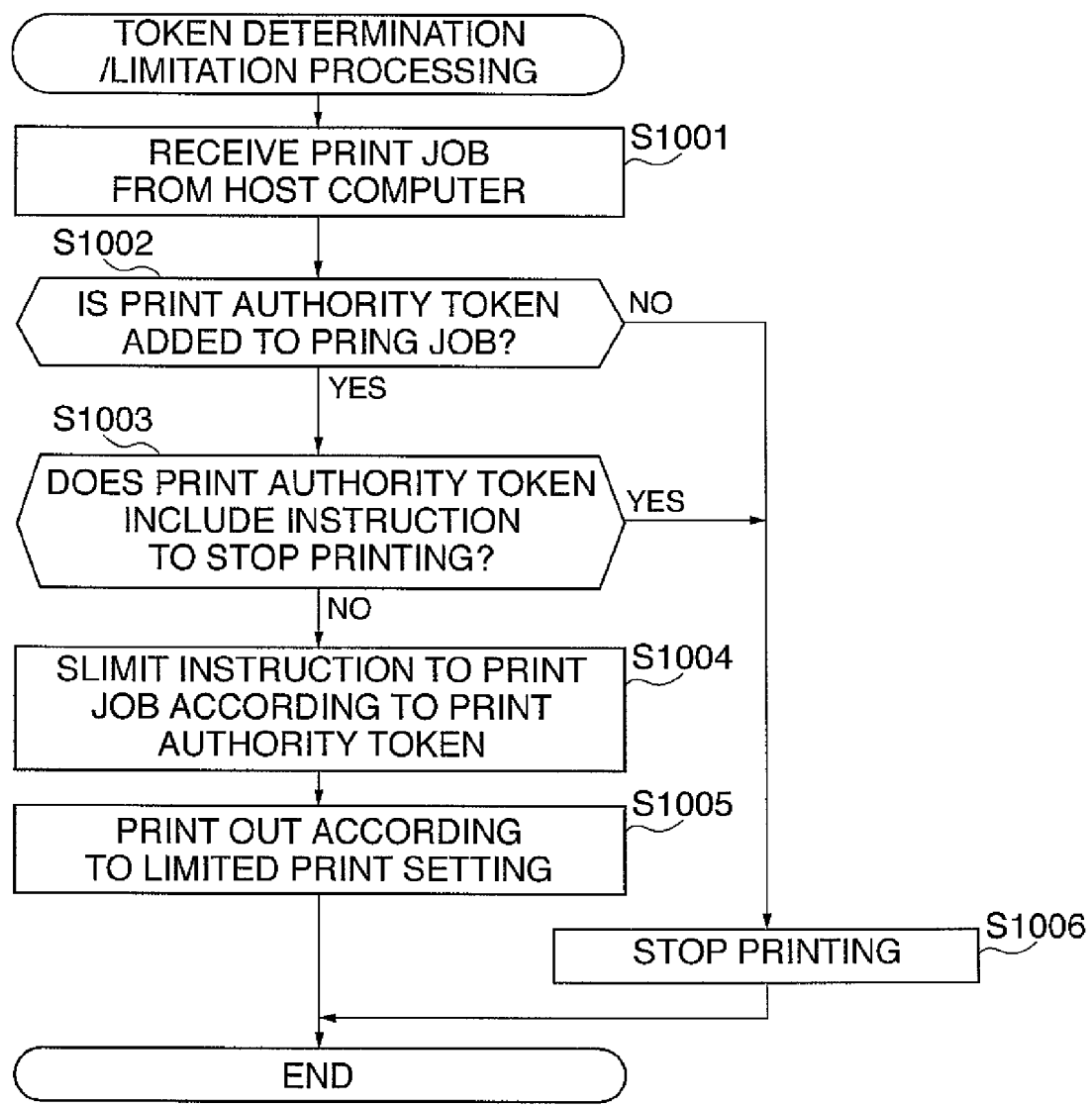
FIG. 10 is a flowchart showing the procedures of token determination/limitation process executed in the step S505 in FIG. 5.
Figures 11, 12:
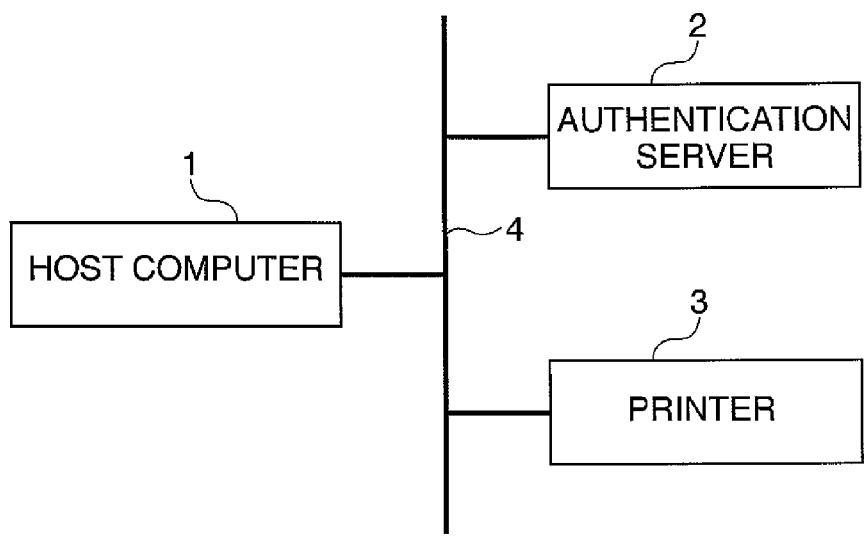
FIG. 11 is a view schematically showing the configuration of a conventional printing system.
FIG. 12 is a table showing a database of authentication data and printout limitation data on a user-by-user basis held in the authentication server in FIG. 11.
Figure 13:
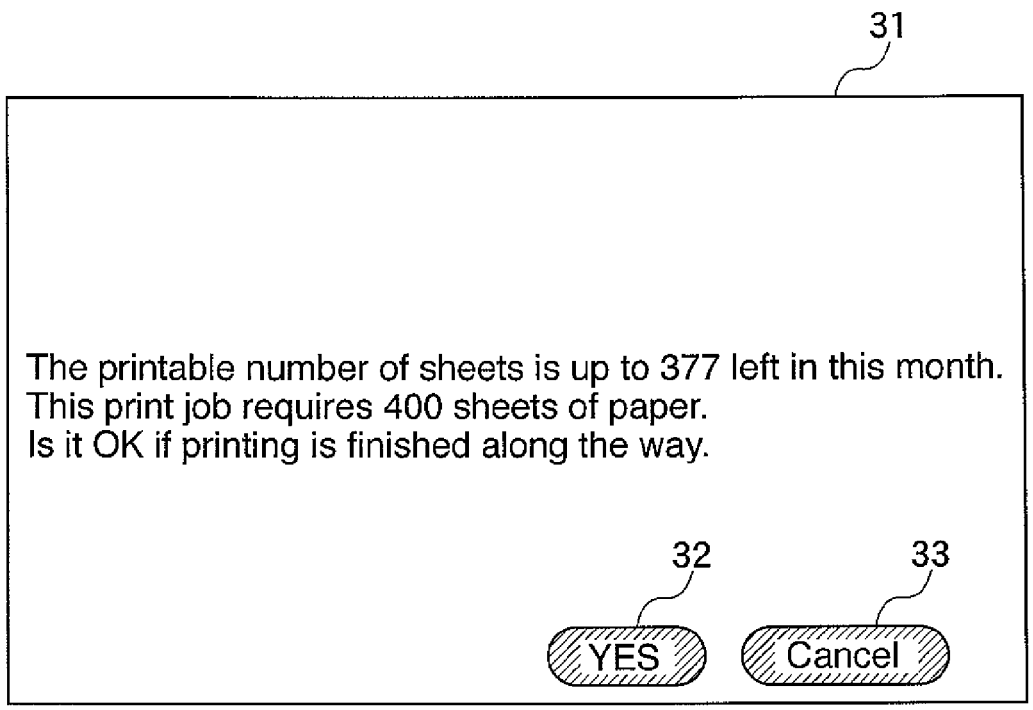
FIG. 13 is a view showing a dialog of GUI (Graphic User Interface) displayed by a printing driver when the host computer 1 executes a print job.

FIG. 10 is a flowchart showing the procedures of the token determination/limitation process executed in the step S505 in FIG. 5.

In FIG. 10, the printer 103 receives the print job from the host computer 101 (step S1001). Next, the printer 403 determines whether or not the print authority token is added to the print job (step S1002). When it is negative, the process proceeds to the step S1006. When it is affirmative, the process proceeds to the step S1003 (step S1002). In the step S1006, printing stops, followed by terminating the process.

In the step S1003, the printer 103 determines whether or not the print authority token includes an instruction to stop printing (Suppress=Yes) in. When it is affirmative, the process proceeds to the step 1006. When it is negative, the process proceeds to the step S1004. In the step S1006, printing stops, followed by terminating the process.

Next, in the step S1004, the printer 103 limits the instruction to the print job according to the print authority token. Specifically, the print setting instruction to the job written in the PDL is compared with the print function limitation information of the print authority token. When it matches conditions for limitation, the instruction to the print job, namely PDL data is changed.

For example, when the setting with regard to the double-sided printing is "one-sided printing" in the print job, namely PDL data, and Duplex value of the print function limitation information is "On (surely double-sided printing), the setting of the print job, namely PDL data, is limited by the print function limitation information, and "double-sided printing is changed. The other Nup (collective printing), Color (color/monochrome) and the like are the same. When the print setting of the PDL is out of the setting of the scope limited by the print function limitation information, the setting of the PDL is limited so that it is within the limitation.

Finally, the printer 103 performs the print job and print out according to the limited print setting of the print job, namely PDL data (step S1005), followed by terminating the process.

It is to be understood that the object of the present invention may also be accomplished by supplying a system or an apparatus with a storage medium in which a program code of software which realizes the functions of the above described embodiment is stored, and causing a computer (or CPU or MPU) of the system or apparatus to read out and execute the program code stored in the storage medium.

In this case, the program code itself read from the storage medium realizes the functions of any of the embodiments described above, and hence the program code and the storage medium in which the program code is stored constitute the present invention.

Examples of the storage medium for supplying the program code include a floppy® disk, a hard disk, a magneticoptical disk, a CD-ROM, a CD-R, a CD-RW, DVD-ROM, a DVD-RAM, a DVD-RW, a DVD+RW, a magnetic tape, a nonvolatile memory card, and a ROM. Alternatively, the program may be downloaded via a network.

Further, it is to be understood that the functions of the above described embodiment may be accomplished not only by executing a program code read out by a computer, but also by causing an OS (operating system) or the like which operates on the computer to perform a part or all of the actual operations based on instructions of the program code.

Further, it is to be understood that the functions of the above described embodiment may be accomplished by writing a program code read out from the storage medium into a memory provided on an expansion board inserted into a computer or in an expansion unit connected to the computer and then causing a CPU or the like provided in the expansion board or the expansion unit to perform a part or all of the actual operations based on instructions of the program code.

While the present invention has been described with reference to exemplary embodiments, it is to be understood that the invention is not limited to the disclosed the embodiments. The scope of the following claims is to be accorded the broadest interpretation so as to encompass all such modifications and equivalent structures and functions.

This application claims the benefit of Japanese Patent Application No. 2006-122385, filed Apr. 26, 2006 which is hereby incorporated by reference herein in its entirety.

What is claimed is:

1. A printing system comprising a printing apparatus adapted to execute a print job, a print control apparatus adapted to control said printing apparatus, a print authority management server adapted to manage a print authority of said printing apparatus, and a data base server adapted to hold print function limitation information, said printing apparatus, said print authority management server, and said data base server being connected with one another via a network, wherein said print control apparatus comprises an information requesting unit adapted to transmit two or more pieces of information required to limit a print function of said printing apparatus, to request production of a print authority token or limiting the print function, the transmitted two or more pieces of information including both of user information related to a user of said printing apparatus and application information related to an application for executing the print job, said print authority management server comprises a token producing unit adapted to receive the two or more pieces of information, search the print function limitation information held in said database server by using, as search keys, the user information and the application information included in the respective pieces of information, compose two or more pieces of the searched print function limitation information with each other in an order of priority among the search keys for producing the print authority token, and transmit the print authority token to said print control apparatus, said print control apparatus comprises a token adding unit adapted to add the received print authority token to the print job and then transmit the print job to said printing apparatus, and said printing apparatus comprises a limiting unit adapted to limit an instruction for the print job based on the print authority token, when the print authority token is added to the received print job.

2. A printing system as claimed in claim 1, wherein one of the transmitted two or more pieces of information is contents information of a document related to the print job.

3. A printing system as claimed in claim 1, wherein one of the transmitted two or more pieces of information is address information of said print control apparatus.

4. A printing system as claimed in claim 1, wherein the print function limited by the print authority token includes a number of sets printed, color/monochrome printing, double-sided printing, or collective printing.

5. A printing system as claimed in claim 1, wherein the print function limited by the print authority token includes the printable number of sets.

6. A printing system as claimed in claim 1, wherein said print control apparatus comprises a printing stop unit adapted to stop transmission of the print job to said printing apparatus when the received print authority token includes an instruction to stop printing.

7. A printing system as claimed in claim 1, wherein said print control apparatus comprises a printing stop unit adapted to stop printing of the print job when the received print authority token includes an instruction to stop printing.

8. A printing method of a printing system comprising a printing apparatus adapted to execute a print job, a print control apparatus adapted to control said printing apparatus, a print authority management server adapted to manage a print authority of said printing apparatus, and a data base server adapted to hold print function limitation information, said printing apparatus, said print authority management server, and said data base server being connected with one another via a network, and the printing method comprising the steps of:

said print control apparatus transmitting two or more pieces of information required to limit a print function of said printing apparatus, to request production of a print authority token for limiting the print function, the transmitted two or more pieces of information including both of user information related to a user of said printing apparatus and application information related to an application for executing the print job;

said print authority management server receiving the two or more pieces of information, searching the print function limitation information held in said database server by using, as search keys, the user information and the application information included in the respective pieces of information, composing two or more pieces of the searched print function limitation information with each other in an order of priority among the search keys for producing the print authority token, and transmitting the print authority token to said print control apparatus;

said print control apparatus adding the received print authority token to the print job and then transmitting the print job to said printing apparatus; and said printing apparatus limiting an instruction for the print job based on the print authority token, when the print authority token is added to the received print job.

9. A non-transitory computer-readable storage medium that stores a program that, when executed by one or more computers in a printing system, causes the one or more computers to execute a printing method, the printing system comprising a printing apparatus adapted to execute a print job, a print control apparatus adapted to control said printing apparatus, a print authority management server adapted to manage a print authority of said printing apparatus, and a data base server adapted to hold print function limitation information, said printing apparatus, said print authority management server, and said data base server being connected with one another via a network, and said printing method comprising the steps of:

said print control apparatus transmitting two or more pieces of information required to limit a print function of said printing apparatus, to request production of a print authority token for limiting the print function, the transmitted two or more pieces of information including both of user information related to a user of said printing apparatus and application information related to an application for executing the print job;

said print authority management server receiving the two or more pieces of information, searching the print function limitation information held in said database server by using, as search keys, the user information and the application information included in the respective pieces of information, composing two or more pieces of the searched print function limitation information with each other in an order of priority among the search keys for producing the print authority token, and transmitting the print authority token to said print control apparatus;

said print control apparatus adding the received print authority token to the print job and then transmitting the print job to said printing apparatus; and said printing apparatus limiting an instruction for the print job based on the print authority token, when the print authority token is added to the received print job.

\* \* \* \* \*